United States Patent
Cai et al.

(10) Patent No.: US 10,311,635 B2
(45) Date of Patent: Jun. 4, 2019

(54) METHOD AND APPARATUS FOR DETECTING REPETITIVE STRUCTURES IN 3D MESH MODELS

(75) Inventors: Kangying Cai, Beijing (CN); Weiwei Li, Beijing (CN); Zhibo Chen, Beijing (CN)

(73) Assignee: InterDigital VC Holdings, Inc., Wilmington, DE (US)

( * ) Notice: Subject to any disclaimer, the term of this patent is extended or adjusted under 35 U.S.C. 154(b) by 344 days.

(21) Appl. No.: 13/807,322

(22) PCT Filed: Jun. 30, 2010

(86) PCT No.: PCT/CN2010/000984
§ 371 (c)(1),
(2), (4) Date: Dec. 28, 2012

(87) PCT Pub. No.: WO2012/000132
PCT Pub. Date: Jan. 5, 2012

(65) Prior Publication Data
US 2013/0103365 A1  Apr. 25, 2013

(51) Int. Cl.
*G06K 9/00* (2006.01)
*G06K 9/46* (2006.01)
(Continued)

(52) U.S. Cl.
CPC .......... *G06T 19/00* (2013.01); *G06K 9/00201* (2013.01); *G06K 9/469* (2013.01);
(Continued)

(58) Field of Classification Search
USPC .......................................................... 703/1
See application file for complete search history.

(56) References Cited

U.S. PATENT DOCUMENTS

| 6,985,526 B2 | 1/2006 | Bottreau et al. |
| 7,412,084 B2 | 8/2008 | Jerebko |

(Continued)

FOREIGN PATENT DOCUMENTS

| CN | 101059335 | 10/2007 |
| CN | 101477687 A | 7/2009 |

(Continued)

OTHER PUBLICATIONS

Kobbelt "A General Framework for Mesh Decimation" 1998.*
(Continued)

*Primary Examiner* — Saif A Alhija
(74) *Attorney, Agent, or Firm* — Brian J. Dorini; Paul P. Kiel

(57) ABSTRACT

Discovering repetitive structures in 3D models is a challenging task. A method for detecting repetitive structures in 3D models comprises sampling the 3D model using a current sampling step size, detecting repetitive structures and remaining portions of the model, determining a representative for each of the one or more repetitive structures, and as long as the detecting step yields one or more repetitive structures, reducing the current sampling step size and repeating the steps of sampling and detecting for each detected representative of a detected repetitive structure and for the remaining portions of the model, wherein the reduced sampling step size is used. The described method and device can e.g. be used for 3D model compression, 3D model repairing, or geometry synthesis.

25 Claims, 3 Drawing Sheets

(51) Int. Cl.
*G06K 9/48* (2006.01)
*G06T 17/10* (2006.01)
*G06T 19/00* (2011.01)

(52) U.S. Cl.
CPC ............... *G06K 9/48* (2013.01); *G06T 17/10* (2013.01); *G06K 2209/29* (2013.01)

(56) References Cited

U.S. PATENT DOCUMENTS

2008/0205717 A1* 8/2008 Reeves et al. ................ 382/128
2010/0066760 A1    3/2010 Mitra et al.

FOREIGN PATENT DOCUMENTS

| EP | 564318 | 12/1999 |
|---|---|---|
| JP | 2003186920 | 7/2003 |
| JP | 2005258839 | 9/2005 |
| JP | 2007065803 | 3/2007 |
| JP | 2010014541 | 1/2010 |

OTHER PUBLICATIONS

Search Rept:dated Mar. 24, 2011.
Comaniciu et al., "Mean Shift: A Robust approach toward feature space analysis"; pattern Analysis and Machine Intelligence, IEEE Trans. on, 2002, vol. 24, No. 5, pp. 603-619.
Mitra et al., "Partial and approximate symmetry detection for 3d geometry", Proceeding SIGGRAPH'06 ACM SIGGRAPH 2006 papers, 2006, vol. 25, No. 3, pp. 560-568.
Rusinkiewicz et al., "Efficient variants of the ICP algorithm", 3D Digital Imaging and Modeling, 2001 Proceedings, Third International Conference, pp. 145-152.
Nishino, Vertex Rearrangement Problem for regularizing 3D Meshes, Faculty of Science and Technoloy, Keio University, 2013, pp. 1-7, Yokohama, Japan.
Pauly et al., "Discovering Structural Regularity in 3D Geometry", ACM Transactions on Graphics, in the proceedings of ACM SIGGRAPH 2008, vol. 27, No. 3, pp. 43:1-43:11.
Blakemore et al., "On the existence of neurons in the human visual system selectively sensitive to the orientation and size of retinal images" 1969, J. Physiol. 203, 237.260.
Liu et al., "Segmenting periodic reliefs on triangle meshes". In Math of Surfaces XII. 2007, Springer, 290.306.
Podolak et al., "A planar-reflective symmetry transform for 3D shapes", 2006, ACM Trans. Gr. 25, 3, 549.559.
Thompson 1961, Thompson, D. W. 1961. "On Growth and Form", Cambridge.
Jian etal., "Novel algorithm on space curve matching", Nanjing Univ. of Aeronaut. & Astronaut, China Mechanical Engineering.
Miao etal., "Curvature-Aware Adaptive Re-Sampling for Point-Sampled Geometry", Computer Aided Design, Jun. 2, 2009, pp. 395-403.
Shikhare etal.—"Compression of Large 3D Engineering Models using Automatic Discovery of Repeating Geometric Features"—Proceedings of the Vision Modeling and Visualization Conference 2001 VMV '01, Stuttgart, Germany, Nov. 21-23, 2001—AKA; IOS Press, Berlin; Amsterdam, Nov. 21, 2011 (Nov. 21, 2001), pp. 233-240—XP002561497, ISBN: 978-3-89838-028-7—abstract.
Ahn etal.—"Geometry compression of 3D models using adaptive quantization for prediction errors"—Proceedings of the picture coding symposium, XX, XX, Apr. 1, 1999 (Apr. 1, 1999)—pp. 193-197, XP000934376—abstract.

* cited by examiner

METHOD AND APPARATUS FOR DETECTING REPETITIVE STRUCTURES IN 3D MESH MODELS

This application claims the benefit, under 35 U.S.C. § 365 of International Application PCT/CN2010/000984, filed Jun. 30, 2010, which was published in accordance with PCT Article 21(2) on Jan. 5, 2012 in English.

FIELD OF THE INVENTION

This invention relates to a method for detecting repetitive structures in 3D mesh models.

BACKGROUND

Repetitive structures are ubiquitous not only in nature, e.g. in biology and physics, but also in other fields, such as engineering and art. Repetitive structures are very common in man-made objects, and fundamental e.g. in almost all design styles in architecture. Therefore, all common types of 3D mesh models generally comprise repetitive structures. Due to increasing complexity of such models, it is desirable to minimize the amount of data required for coding them. It has been found that symmetry, including repetitive structures, is a kind of redundancy that may be used to reduce complexity: Repetitive structures need to be encoded only once, and can be called or "instantiated" several times. In order to benefit from this redundancy, it is necessary to detect repetitive structures in existing 3D mesh models. Traditional methods use a technique for segmenting periodic structures that relies on a user to manually identify repetitive elements. Obviously such user assistance is unwanted.

Each instance of a repetitive structure can be individually modified by transformations, such as rotations, translations, reflections and uniform scaling. A known method[1] for (partial) symmetry detection, even at different scales, uses an approach that is called "transformation voting": it comprises constructing a transformation space, clustering possible transformations and deciding symmetry by transformation clusters. E.g. Mitra[1] calculates in a first step local shape descriptors, which are then used to pair up points that could be mapped to each other under a candidate symmetry action. A set of possible candidate transformations is called transformation space. Pairs with similar transformations form clusters in the transformation space, which provide evidence for the corresponding symmetry relation. In a second step, point pairs whose transformation falls into a cluster are checked for spatial consistency. A stochastic clustering provides surface correspondences, so that only a small set of candidates samples needs to be considered when detecting and extracting symmetric surface patches. Curvature descriptors are used to pair sample points; candidate point pairs are discarded if their curvature descriptors differ too much. Similarly, it is known[2] to group sample points into "similarity sets" according to curvature descriptors. Curvature is generally the amount by which a geometric object deviates from being flat.

One reason for the usage of clustering is that the amount of data to be compared is very high. The number of sampling points, and thus the data amount, highly depends on the sampling step size: smaller sampling steps result in more data, which makes the clustering steps less efficient. However, larger sampling steps result in the omission of small-scale structures.

SUMMARY OF THE INVENTION

The present invention provides an improvement to known 3D compression methods, and in particular to transformation voting methods. The latter have usually steps of finding candidates for symmetries by transformation clustering and then comparing the candidates. They may be employed in 3D compression or other applications.

The improvement provided by the present invention concerns at least the sampling step size. In particular, the present invention uses an iterative uniform sampling method with a decreasing sampling step size. A given 3D mesh model is uniformly sampled with an initial sampling step size, which is relatively large. Then, the sampling points are clustered according to their curvature, and then transformations are determined between sampling points that belong to the same cluster. These are so-called candidate transformations. Thus, the candidate transformations need to be determined only for those sampling point pairs where both points have similar curvature. Such clustering step not only improves the algorithm efficiency, but also increases the algorithm accuracy. The transformation space, which is constructed by all the transformations calculated before, contains less noise elements than it would if the sampling step size was smaller. Thus, a subsequent clustering step will be more likely to discover all the repetitive structures. If the model comprises repetitive structures, the usual result of such clustering is that one or more distinct clusters will emerge. In the next step, the (most relevant) clusters are selected, and the corresponding transformations and sampling point pairs are assumed to indicate a repetitive structure. The most relevant clusters are those which are most significant and apparent. Other transformations that don't belong to a cluster are discarded.

This procedure is iteratively executed with a decreasing sampling step. Each iteration skips repetitions, and only processes remaining parts of the model and representatives of the representative structures that were detected in the previous iteration. Thus, also multi-scale repetitive structures on the 3D model can be discovered. The iterative process stops when the number of repetitive structures is stable, or when a pre-defined minimum sampling step size is reached. It is also possible to define a time-out, measure the runtime of the process, and terminate the process when the runtime exceeds the time-out.

The additional clustering and iteration steps reduce the amount of possible transformations to be investigated, and thus the required processing capacity.

According to one embodiment of the invention, a method for detecting repetitive structures in 3D mesh models comprises steps of sampling the 3D mesh model using a current (uniform) sampling step size, detecting within the 3D mesh model one or more repetitive structures and remaining portions of the model, and determining a representative for each of the one or more repetitive structures, as long as the detecting step yields one or more repetitive structures using the current sampling step size,
  reducing the current sampling step size to obtain a reduced sampling step size, and
  repeating the steps of sampling and detecting for each detected representative of a detected repetitive structure and for the remaining portions of the model, wherein the reduced sampling step size is used as the current sampling step size. The detected multi-scale repetitive structure is recorded in a tree structure. If the detecting step yields no more repetitive structures, or if a pre-defined minimum sampling step size or time-out is reached, the method for detecting repetitive structures is terminated.

In one embodiment, each detecting step comprises steps of calculating a curvature descriptor for each sampling point, based on the respective current sampling step size, clustering the sampling points according to their curvature descriptor, wherein one or more sampling point clusters are obtained, calculating transformations between pairs of sampling points that belong to a common sampling point cluster, clustering the calculated transformations in a transformation space, wherein one or more transformation clusters are obtained, and determining, according to each of the one or more transformation clusters in the transformation space, a repetitive structure and its representative, wherein pairs of sampling points whose transformation belongs to a common cluster in the transformation space are defined as two instances of a repetitive structure.

According to one embodiment of the invention, a device for detecting repetitive structures in 3D mesh models comprises sampling means for sampling the 3D mesh model using a current (uniform) sampling step size, detection means for detecting within the 3D mesh model one or more repetitive structures and remaining portions of the model, determining means for determining a representative for each of the one or more repetitive structures, reducing means for reducing the current sampling step size to obtain a reduced sampling step size, and control means for controlling, as long as the detection means detects one or more repetitive structures using the current sampling step size, the repeated operation of the reducing means, the sampling means and the detecting means for each detected representative of a detected repetitive structure and for the remaining portions of the model, wherein the reduced sampling step size is used as the current sampling step size.

If the detecting means does not detect any more repetitive structures, or if a pre-defined minimum sampling step size or time-out is reached, the device for detecting repetitive structures is stopped.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a block diagram of the method for discovering repetitive structures in 3D models.

DETAILED DESCRIPTION OF THE INVENTION

Figure 1:
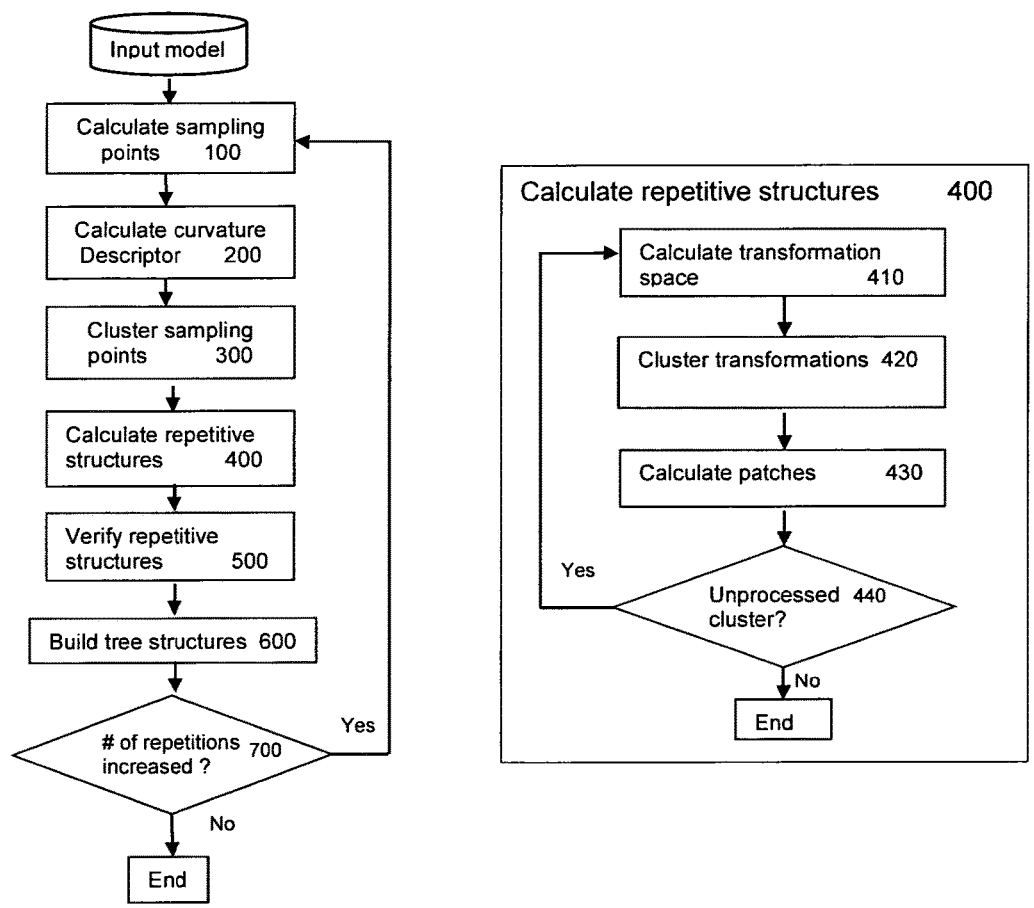

FIG. 1 shows a block diagram of a method for discovering repetitive structures in 3D models. For an input model, sampling points are calculated 100, wherein a relatively large initial sampling step size is used. In the next step 200, a curvature descriptor is calculated for each sampling point. The sampling points are clustered 300 according to their curvature descriptors, i.e. sampling points with similar curvature descriptors are put into the same cluster. Among the sampling points within a cluster, repetitive structures are detected (i.e. calculated) 400 and verified 500. From the detected repetitive structures, a tree is constructed where each repetitive structure is represented by a sub-branch. Finally, it is checked 700 whether the number of repetitions has increased in the previous steps. For input models that contain repetitive structures (like most models), this will initially always be the case. In this case, the sampling step size is decreased, and sampling points are re-calculated for sub-structures of a cluster.

An efficient method for detecting repetitive structures on 3D models is disclosed, which can automatically discover repetitive structures of any small scale and multi-scale repetitive structures. The key ideas include clustering all sampling points based on their curvature and iteratively processing the model with a decreasing sampling step. A block diagram of this method is shown in FIG. 1. In this algorithm, the input data set in can be a point set or a mesh-based model.

For recording the multi-scale repetitive structures detected by the method, a tree structure is used. Each node of the tree records one repetitive structure. In the beginning, the tree only has the root corresponding to the input model. The sampling step H is initially a relatively large number.

Sampling block 100 uniformly samples the surface. In this diagram, the current sampling step is denoted as H.

Curvature descriptor computing block 200 computes the curvature descriptor of each sampling point. For a sampling point $p_i$, we calculate its mean curvature $H(p_i)$, Gaussian curvature $K(p_i)$, principal curvatures $K_{i1}$, $K_{i2}$ and principal direction $C_{i1}$, $C_{i2}$. Any method can be used to calculate the curvature descriptor, e.g. the method described in section 3-5 of [Meyer et al. 2002][3]. The curvature descriptor of $p_i$ is $$cd(p_i) = H(p_i)^2 / K(p_i) \qquad (1)$$

$K_{i1}$, $K_{i2}$, $C_{i1}$ and $C_{i2}$ are useful in the next calculations described below. More details about the curvature descriptor are given below.

Block 300 clusters sampling points according to their curvature descriptors. We use mean-shift algorithm (as commonly known, and described e.g. in [Comaniciu et al.][4]) as our cluster operator. The density function is defined as:

$$\rho(H(v)^2/K(v)) = \Sigma_i (H(v)^2/K(v) - H(v_i)^2/K(v_i))/h \qquad (1a)$$

where h is as suggested by [Comaniciu et al.][4].

Block 300 improves the efficiency and robustness of the subsequent analysis steps by pruning the unnecessary sample pairs, since the same repetitive structure consists of points with similar curvature.

Block 400 calculates the repetitive structures of a current level. It deals with every sampling point cluster separately. Let $\Phi_k$ denote the cluster currently being processed.

Block 410 calculates the transformation space $\Gamma_k$ of $\Phi_k$, e.g. by the method described in [Mitra et al. 2006][1]. A transform $T_{i,j} \in \Gamma_k$ transforms point $p_i \in \Phi_k$ to another point $p_j \in \Phi_k$. Block 200 has already calculated the principal curvatures $K_{i1}$, $K_{i2}$ and principal direction $C_{i1}$, $C_{i2}$ of one sampling point $p_i$.

$C_{i1}$ and $C_{i2}$ define the local frame $(C_{i1}, C_{i2}, n_i)$ of $p_i$ where $n_i = C_{i1} \times C_{i2}$. There are two sequential rotation operations, $R_{1ij}$ and $R_{2ij}$. $R_{1ij}$ first makes $n_i$ parallel with $n_j$. Then $R_{2ij}$ makes $C_{i1}$ parallel with $C_{j1}$. The scaling factor $s_{i,j}$ is calculated by $$s_{i,j} = (K_{i1}/K_{j1} + K_{i2}/K_{j2})/2 \qquad (2)$$

The translation $t_{i,j}$ is calculated by $$t_{i,j}=p_j-s_{i,j}R_{i,j}p_i \quad (3)$$

Thus, we obtain the 7-dimensional $$T_{i,j}=(s_{i,j},Rx_{i,j},Ry_{i,j},Rz_{i,j},t_{xi,j},t_{yi,j},t_{zi,j}) \quad (4)$$

where $Rx_{i,j}$, $Ry_{i,j}$, $Rz_{i,j}$ are the Euler angles, standing for a rotation $R_2$, and $t_{i,j}=[t_{xi,j}, t_{yi,j}, t_{zi,j}]^T$ stands for a translation.

Block 420 clusters all the transformations in $\Gamma_k$. Like the existing algorithms, we choose mean-shift as clustering operator of this step. The transformations in the same cluster usually represent the same repetitive structure.

Block 430 calculates surface patches corresponding to repetitive structures. We deal with clusters calculated in Block 420 in the decreasing order of their size. Let $C_k$ denote the transformation cluster being processed. Like [Mitra et al. 2006][1], we calculate surface patches by an incremental patch growing process, which starts from a random point $T_{i,j}$ in $C_k$. $T_{i,j}$ corresponds to a pair of sampling points $(p_i, p_j)$. Suppose $p_{i1}$ is one surface vertex of the one-ring neighbors of $p_i$ and $p'_{i1}=T_{i,j}S_{i,j}R_{2i,j}R_{1i,j}p_{i1}$. Dis_Sur is the distance between $p'_{i1}$ and the surface around $p_j$ and Dis_Pt is the distance between $p'_{i1}$ and $p_j$:

$$\text{Dis}=u_1*\text{Dis\_Sur}+u_2*\text{Dis\_Pt}, u_1+u_2=1 \quad (5)$$

where $u_1$ and $u_2$ are some constants (we set $u_1=0.8$, $u_2=0.2$). If Dis is below a threshold, $p_{i1}$ is added to the surface patch which starts from $p_i$. The surface patch is kept growing from its current boundary until no more points can be added in. After the surface patch starting from $p_i$ is finished, we calculate the surface patch starting from $p_j$. Such two surface patches will be added to two patch sets, $\{Pat_i\}$ and $\{Pat_j\}$, respectively. During the patch growing process, we mark all the visited sampling points and the transformations involving them. New patches will be built if there is any un-marked transformation in $C_k$. At last, for each cluster, two patch sets are calculated and are instances of the same repetitive structures. One patch set is chosen as the representative and the other one is regarded as the instance of the corresponding repetitive structures.

Block 500 uses an Iterated Closest Points (ICP) algorithm, e.g. as known from [RUSINKIEWICZ et al 2001][5], to verify the repetitive structures discovered in Block 400. At first, we check whether the instance structures can exactly match their corresponding representatives by ICP. Those repetitive structures cannot pass this test are discarded. Then, we try to match each pair of the left representatives by ICP. For those two representatives exactly matched, the corresponding repetitive structures are combined.

Figure 3:
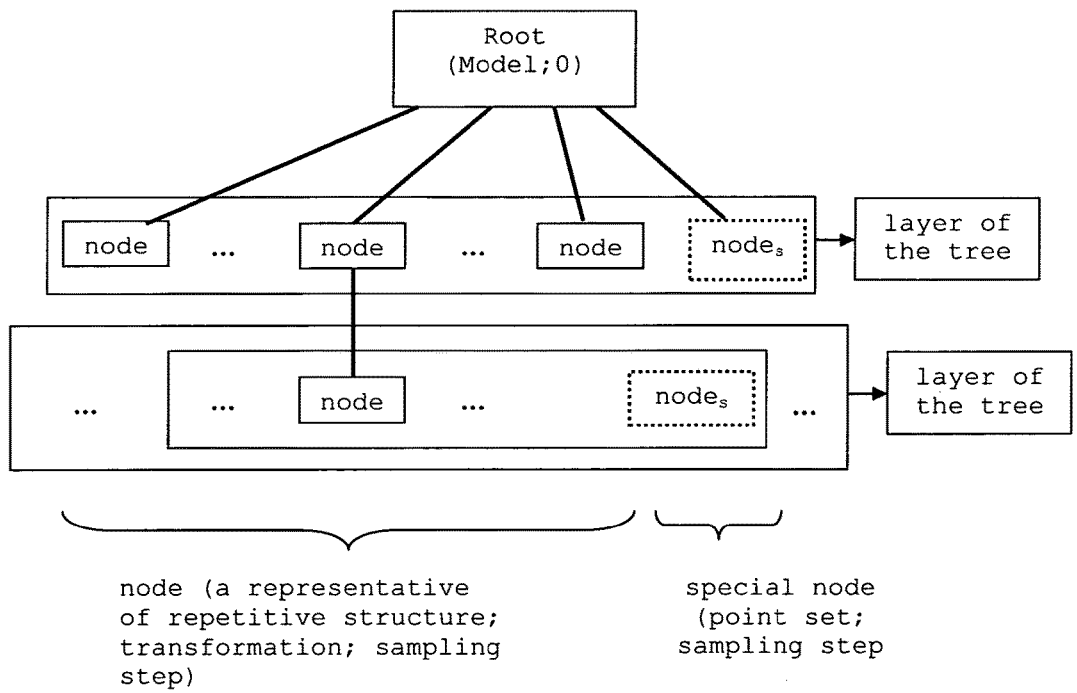
FIG. 3 a tree structure for recording the detected multi-scale repetitive structure.

Block 600 updates the tree structure which records the detected multi-scale repetitive structure, as shown in FIG. 3. The repetitive structures just detected are added as leafs of the corresponding node. A special leaf node is added, which corresponds to the part of surface that does not contain any repetitive structure. There may be smaller scale repetitive structures, which will be detected in the next iteration of the algorithm.

In the next iteration, the sampling step will be the half of the original size. The algorithm deals with all the leaf nodes separately. In one embodiment, the algorithm is stopped when the sampling step is smaller than a threshold.

In one embodiment, the sampling step threshold for stopping the algorithm depends on the input model, and in particular on the diameter of the bounding-box of the input model. That is, a bounding-box (e.g. in a Cartesian coordinate system along the x,y,z-axes) is constructed around the complete model, the length of a diagonal from $(x_{min}, y_{min}, z_{min})$ to $(x_{max}, y_{max}, z_{max})$ is calculated, and then the sampling step size threshold is set to be a fraction thereof, e.g. 0.5% (diagonal_length/200) or similar.

Figure 2:
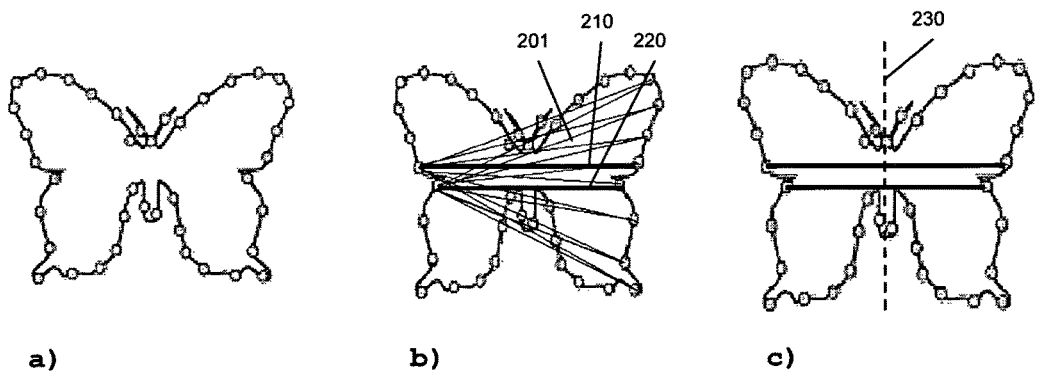
FIG. 2 the principle of symmetry detection.

FIG. 2 shows an example of a 3D model. While in a) the sampling points referring to any particular step size are shown, b) shows possible transformations that are constructed in the prior art: For each sampling point, a transformation to each other sampling point is calculated. However, for the present invention such transformations are calculated only for point pairs that have similar curvature, such as 201,210,220. After clustering, those transformations that relate to a real symmetry can be identified, since they are so similar that they end up in a common transformation cluster. In FIG. 2c), the determined symmetry of this exemplary model is shown: a reflection on a symmetry axis 230.

It is noted here that the prior art ([Mitra 2006][1]) only deals with those sampling point pairs whose two sampling points have similar signatures. The method is as follows: Suppose $p_i$ is one sampling point and P is the sampling points set. $k_{i1}/k_{i2}$ is the signature of $p_i$ where $k_{i1}$ and $k_{i2}$ are the principal curvatures of $p_i$. All sample points are mapped to a signature space $\Omega$. Only point pairs that are close in $\Omega$ are considered as suitable candidates for a later analyzing process. Prior art first selects a random subset $P^*\subset P$. The candidate point pairs for later analyzing are $(p^*, p)$, where $p^*\in P^*$ and $p\in P$. For a given sample point $p_i\in P^*$, prior art determines all suitable partners in P by performing a range query in $\Omega$. Prior art uses standard spatial proximity data structures kd-tree to find all suitable partners of $p_i$. By this method, prior art can avoid an exhaustive computation of a quadratic number of point pairs. In the present invention, we achieve the same purpose by clustering all the sampling points according to their curvature descriptor. Compared with the method of randomly choosing a subset of sampling points as used by prior art, the invention is more precise and can guarantee detecting all repetitive structures in any scales, while prior art cannot.

Since symmetry is an important concept for the invention, it is clarified here that symmetry means invariance under a set of transformations, such as rotations, translations, reflections and uniform scaling.

Further, curvature and the curvature descriptor is a well-defined mathematical concept, and its construction is known in the prior art (e.g. Pauly[2]). Mean curvature $H(v_i)$ of $v_i$ is independent of the employed coordinate system. Gaussian curvature $K(v_i)$ is dependent on the 3D coordinate system, and defined by $$K(v_i) = \frac{1}{A(v_i)}\left(2\pi - \sum_{v_j\in N_1(v_i)} \theta_j\right) \quad (6)$$

$k_{i1}$ and $k_{i2}$ are two principle curvatures of $v_i$. According to Differential Geometry, Gaussian curvature $K(v_i)$ and mean curvature $H(v_i)$ can be expressed by the two principle curvatures as:

$$K(v_i)=k_{i1}*k_{i2} \quad (7)$$

$$H(v_i)=k_{i1}+k_{i2} \quad (8)$$

Therefore we can define the principal curvatures as:

$$k_{i1} = \frac{1}{2}\left(H(v_i) + \sqrt{H(v_i)^2 - 4*K(v_i)}\right) \quad (9)$$

-continued $$k_{i2} = \frac{1}{2}\left(H(v_i) - \sqrt{H(v_i)^2 - 4*K(v_i)}\right) \qquad (10)$$

From eq. (9) and (10), we can get the curvature descriptor as $$H(v_i)^2/K(v_i) = (k_{i1}+k_{i2})^2/(k_{i1}*k_{i2}) = \frac{k_{i1}}{k_{i2}} + \frac{k_{i2}}{k_{i1}} + 2 \qquad (11)$$

Thus, $H(v_i)^2/K(v_i)$ is invariant under scaling, rotation and translation transformation. Thus we use $H(v_i)^2/K(v_i)$ as the shape descriptor, and cluster sample points according to $H(v_i)^2/K(v_i)$. The same curvature descriptor has been used by in [Pauly et al. 2008][2], but for a different purpose.

Figure 4:
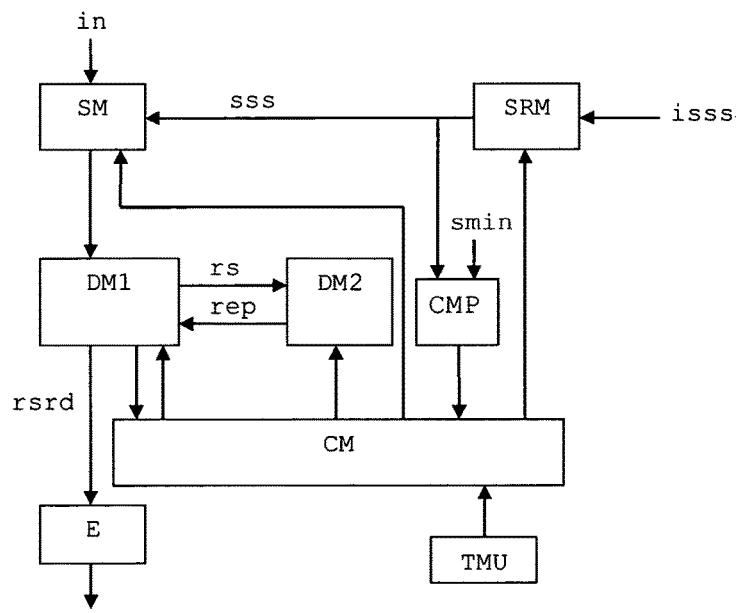
FIG. 4 a block diagram of a device for discovering repetitive structures.

FIG. 4 shows a device for detecting repetitive structures in 3D mesh models according to one embodiment of the invention. It comprises sampling means SM, i.e. a sampling unit, for sampling the 3D mesh model provided at the input in. It uses a current uniform sampling step size sss that it receives from another unit, as described below.

The sampling unit SM provides sampled data to a detection means DM1, which detects within the sampled 3D mesh model one or more repetitive structures and identifies remaining portions of the model that are no repetitive structures. Each repetitive structure rs is provided to a determining means DM2, which determines a representative rep for each of the one or more repetitive structures. The representative (i.e. its data) is provided back to the detecting means DM1, which uses it for identifying (further) repetitions thereof.

Sampling and control data of repetitive structures and the above-mentioned remaining data portions rsrd are provided as output, e.g. to an encoder E. These data rsrd comprise sampling data of a representative for each repetitive structure and of each remaining portion, having the sampling step size in which they were sampled. The data rsrd also comprise data defining the repetitions of the repetitive structures. An example is given below.

Further, the device has control means CM for controlling, as long as the detection means detects one or more repetitive structures using the current sampling step size, a repeated operation of the device. That is, if the detecting means DM1 signals to the control means CM that it has finished its operation on a model and that it has identified at least one repetitive structure, then the control means CM controls a sampling step size reducing means SRM to reduce the sampling step size. Further, the control means CM controls the sampling means SM, the detecting means DM1 and the determining means DM2 to repeat their operation for each detected representative of a detected repetitive structure and for the remaining portions of the model, using the reduced sampling step size.

The sampling step size is initially a pre-defined value isss, and is successively reduced by a given factor f. In one embodiment, this factor is a constant integer. In one embodiment, this factor is "2". That is, while in a first iteration the sampling step size is the pre-defined value isss, it will be isss/2 in a second iteration, isss/4 in a third iteration etc. Note that second and further iterations are only performed for representatives of a repetitive structure and for remainders.

If the detecting means DM1 does not detect any more repetitive structures, or if a pre-defined minimum sampling step size smin or a time-out is reached, the device for detecting repetitive structures is stopped. For this purpose, the device comprises, in one embodiment, a time-out measurement unit TMU, and in one embodiment a sampling step size comparison unit CMP.

In one embodiment, the detected multi-scale repetitive structure is recorded as a tree structure in a memory device.

Figure 5:
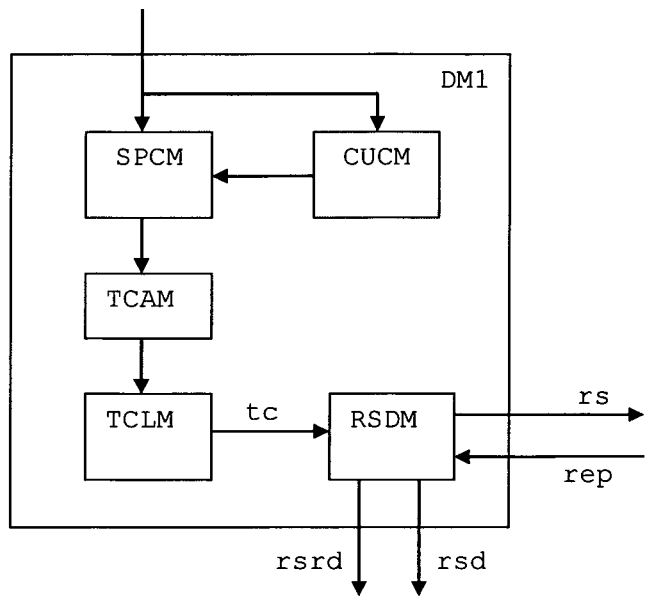
FIG. 5 a block diagram of a detecting means for detecting repetitive structures.

FIG. 5 shows details of one embodiment of the detecting means DM1. It comprises curvature calculating means CUCM for calculating a curvature descriptor for each sampling point, based on the respective current sampling step size. Curvature descriptors are described above. A sampling point clustering means SPCM clusters the sampling points according to their curvature descriptor, wherein one or more sampling point clusters are provided. Transformation calculating means TCAM is used for calculating transformations between pairs of sampling points that belong to a common sampling point cluster, and transformation clustering means TCLM is used for clustering the calculated transformations. This is done in a transformation space, and results in one or more transformation clusters tc being provided. Finally, the detecting means DM1, comprises repetitive structure determining means RSDM for determining, according to each of the one or more transformation clusters in the transformation space, a repetitive structure rs, wherein pairs of sampling points whose transformation belongs to a common cluster in the transformation space are defined as two instances of a repetitive structure. The repetitive structure rs is provided to the above-mentioned determining means DM2, which determines (i.e. identifies) a representative rep for the repetitive structure. This may happen in any arbitrary manner, e.g. the first determined instance of a repetitive structure is selected as representative, and all further instances are selected as repetitions. The repetitive structure determining means RSDM outputs first data rsrd defining the whole model, as described below, and second data rsd indicating whether or not at least one repetitive structure has been found. The latter data rsd is provided to the control block CM, which may decide to initiate another iteration.

Figure 6:
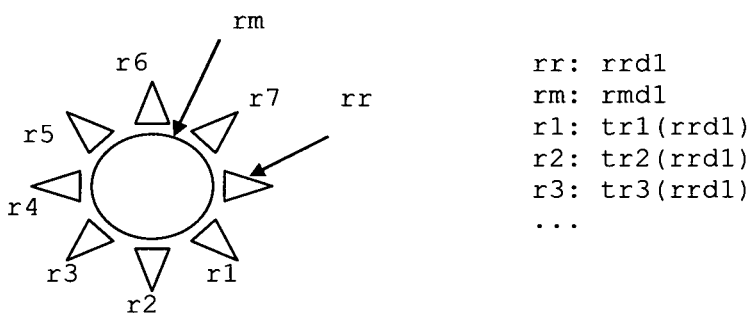
FIG. 6 an exemplary 3D mesh model and its corresponding data set.

FIG. 6 shows an example of the data defining the repetitive structures and the remaining data portions of an exemplary 3D mesh model. It is pointed out here that this is a simplified example for explaining a basic principle of one embodiment.

FIG. 6 shows a 3D mesh model comprising one repetitive structure that is used several times and a remainder that is no repetitive structure. In this example, the repetitive structure is a triangle and the remainder rm is a circle. As also shown in FIG. 6, the above-mentioned data rsrd comprise sampling data rrd1 of a representative rr of the repetitive structure, and repetition data r1, r2, . . . indicating individual repetitions thereof and their respective transformations tr1(rrd1), tr2 (rrd1), . . . for defining the position, scale etc. of each repetition. Further, the data rsrd comprise sampling data rmd1 defining the remainder. While in this example the remainder is only one single structure, it may also be two or more individual sub-structures.

Figure 7:
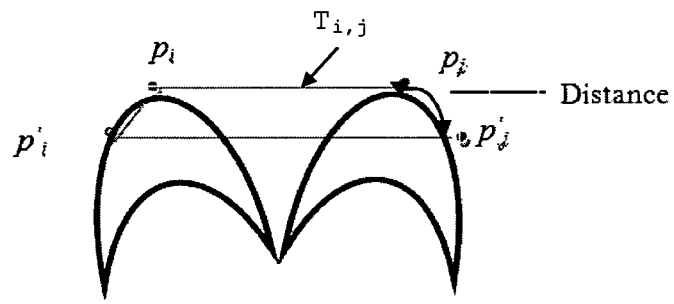
FIG. 7 a transformation between points of a point pair.

FIG. 7 shows a transformation between points of a point pair. $(p_i,p_j)$ is a point pair of $C_k$, and $T_{i,j}$ is the transformation between them. $p'_i$ is a one-ring neighbour of $p_i$. Transforming $p'_i$ by $T_{i,j}$ can obtain $p'_j$. That is: if the $p'_i$ after transformation is close to the actual $p'_j$ (e.g. within a threshold circle), the transform $T_{i,j}$ is a good candidate. If the transform $T_{i,j}$ is a good candidate for several points, it is used for determining a symmetry.

Discovering repetitive structures in 3D models is a challenging task, but the result is very useful in many aspects.

The described method and device can e.g. be used for 3D model compression, 3D model repairing, geometry synthesis etc.

A compact representation of a 3D model can be generated, based on the result of detecting repetitive structures. Such representation will include:
- some bits to indicate the number of repetitive structures;
- for each representatives of repetitive structures, some bits to show the compressed geometry pattern;
- some bits to indicate the number of instances of repetitive structures; and
- for each instance, some bits to show its transformation and some bits to show the representative ID.

The invention has at least the following advantages over known algorithms for repetitive structure detection.

First, for all types of models, repetitive structures can be detected more quickly, as first all sampling points are clustered according to their curvature and then each cluster of sampling points is handled separately.

Second, the invention is suitable for detecting all repetitive structures in a model, while known methods are not. E.g. when processing models that contain small scale structures, known methods need a large number of sampling points in order to detect all repetitive structures, and e.g. the clustering would fail when the number of sampling points becomes too high.

Third, for models with multi-scale repetitive structures, the invention can detect all levels of repetitive structures while the current methods cannot, as we iteratively detect the repetitive structures using a decreasing sampling step.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

NOTES

[1] "Partial and Approximate Symmetry Detection for 3D Geometry", 2006 by N. Mitra, L. Guibas, M. Pauly, ACM Trans. Gr. 25, 3, 560.568

[2] "Discovering Structural Regularity in 3D Geometry", M. Pauly, N. Mitra, J. Wallner, H. Pottmann, L. Guibas, 2008, ACM Trans. Gr. 27, 3

[3] "Discrete differential geometry operators for triangulated 2-manifolds", Meyer M, Desbrun M, Schröder P, Barr A, in: Visualization and Mathematics, Berlin, 2002, 52-58

[4] "Mean shift: A robust approach toward feature space analysis", Comaniciu D., Meer P.; 2002 IEEE Trans. PAMI 24, 5, 603-619

[5] "Efficient variants of the ICP algorithm", RUSINKIEWICZ, S. and LEVOY, M., 2001, in 3*DIM*, 145-152

The invention claimed is:

1. A method for detecting repetitive structures in 3D mesh models, comprising
   a) generating sampling points from the 3D mesh model by sampling said 3D mesh model using a current sampling step size;
   b) clustering said sampling points into a set of sampling point clusters according to curvature descriptors associated with said sampling points;
   c) for each sampling point cluster:
      pairing the sampling points, a first and a second sampling points being paired when a value representative of the curvature descriptor associated with each of said first and second sampling point is invariant under a determined transformation,
      determining a transformation space that comprises a set of transformations used to pair said sampling points,
      clustering said transformations of said transformation space into a set of transformation clusters,
      detecting, within each transformation cluster, one or more repetitive structures from the pairs of sampling points associated with said each transformation cluster and determining a representative for each of the one or more repetitive structures,
   d) reducing the current sampling step size to obtain a reduced sampling step size,
   e) sampling each determined representative of each of the one or more detected repetitive structure and a remaining portion of the model having no detected repetitive structure using the reduced sampling step size to obtain sampling points;
   f) repeating b) to e) until a determined sampling step size is reached; and
   g) generating a compact representation of said 3D mesh model using a result of said detecting one or more repetitive structures.

2. The method according to claim 1, wherein pairs of sampling points whose transformation belongs to a common cluster in the transformation space are defined as two instances of a repetitive structure.

3. The method according to claim 2, wherein the curvature descriptor comprises a mean curvature, Gaussian curvatures and principal curvatures.

4. The method according to claim 2, wherein the clustering uses the mean shift algorithm.

5. The method according to claim 2, wherein said set of transformations comprises at least one of a rotation, translation, reflection and uniform scaling.

6. The method according to claim 1, further comprising encoding the 3D model, wherein a reference model for the repetitive structure is encoded only once, and instances of the repetitive structure are encoded by reference to the encoded reference model.

7. The method according to claim 1, wherein the method is terminated if the detecting step yields no more repetitive structures.

8. The method according claim 1, further comprising an initial step of calculating the determined sampling step size, wherein the determined sampling step size is calculated from parameters of the 3D mesh model.

9. The method according to claim 8, wherein a bounding box around the 3D mesh model is constructed, the length of a diagonal of said bounding box is calculated and the determined sampling step size is set as a fraction of the diagonal length.

10. The method according to claim 1, further comprising measuring the process run-time, wherein the method is terminated if the process run-time reaches a pre-defined time-out value.

11. A device for detecting repetitive structures in 3D mesh models, comprising means for
   a) generating sampling points from the 3D mesh model by sampling said 3D mesh model using a current sampling step size;
   b) clustering said sampling points into a set of sampling point clusters according to curvature descriptors associated with said sampling points;
   c) for each sampling point cluster:
      pairing the sampling points, a first and a second sampling points being paired when a value representative of the curvature descriptor associated with each of said first and second sampling point is invariant under a determined transformation,
      determining a transformation space that comprises a set of transformations used to pair said sampling points,
      clustering said transformations of said transformation space into a set of transformation clusters,
      detecting, within each transformation cluster, one or more repetitive structures from the pairs of sampling points associated with said each transformation cluster and determining a representative for each of the one or more repetitive structures,
   d) reducing the current sampling step size to obtain a reduced sampling step size,
   e) sampling each determined representative of each of the one or more detected repetitive structures and a remaining portion of the model having no detected repetitive structure using the reduced sampling step size to obtain sampling points;
   f) repeating steps b) to e) until a determined sampling step size is reached; and
   g) generating a compact representation of said 3D mesh model using a result of said detecting one or more repetitive structures.

12. The device according to claim 11, wherein pairs of sampling points whose transformation belongs to a common cluster in the transformation space are defined as two instances of a repetitive structure.

13. The device according to claim 11, further comprising an encoder for encoding the 3D model, wherein a reference model for the repetitive structure is encoded only once, and instances of the repetitive structure are encoded by reference to the encoded reference model.

14. The device according to claim 11, further comprising comparator means for comparing the reduced sampling step size with a pre-defined minimum sampling step size.

15. The device according to claim 11, further comprising a time measuring unit for measuring the process run-time, wherein the method is terminated if the process run-time reaches a pre-defined time-out value.

16. A device for detecting repetitive structures in 3D mesh models, comprising a processor and a memory adapted for storing instructions that when executed by the processor cause the processor to perform
   a) generating sampling points from the 3D mesh model by sampling said 3D mesh model using a current sampling step size;
   b) clustering said sampling points into a set of sampling point clusters according to curvature descriptors associated with said sampling points;
   c) for each sampling point cluster:
      pairing the sampling points, a first and a second sampling points being paired when a value representative of the curvature descriptor associated with each of said first and second sampling point is invariant under a determined transformation,
      determining a transformation space that comprises a set of transformations used to pair said sampling points,
      clustering said transformations of said transformation space into a set of transformation clusters,
      detecting, within each transformation cluster, one or more repetitive structures from the pairs of sampling points associated with said each transformation cluster and determining a representative for each of the one or more repetitive structures,
   d) reducing the current sampling step size to obtain a reduced sampling step size,
   e) sampling each determined representative of each of the one or more detected repetitive structures and a remaining portion of the model having no detected repetitive structure using the reduced sampling step size to obtain sampling points;
   f) repeating steps b) to e) until a determined sampling step size is reached; and
   g) generating a compact representation of said 3D mesh model using a result of said detecting one or more repetitive structures.

17. The device according to claim 16, wherein pairs of sampling points whose transformation belongs to a common cluster in the transformation space are defined as two instances of a repetitive structure.

18. The device according to claim 17, wherein the curvature descriptor comprises a mean curvature, Gaussian curvatures and principal curvatures.

19. The device according to claim 17, wherein said clustering uses the mean shift algorithm.

20. The device according to claim 17, wherein said set of transformations comprises at least one of a rotation, translation, reflection and uniform scaling.

21. The device according to claim 16, further comprising encoding the 3D model, wherein a reference model for the repetitive structure is encoded only once, and instances of the repetitive structure are encoded by reference to the encoded reference model.

22. The device according to claim 16, wherein the repeating is terminated if the detecting step yields no more repetitive structures.

23. The device according to claim 16, further comprising initially calculating the determined sampling step size, wherein the determined sampling step size is calculated from parameters of the 3D mesh model.

24. The device according to claim 23, wherein a bounding box around the 3D mesh model is constructed, the length of a diagonal of said bounding box is calculated and the determined sampling step size is set as a fraction of the diagonal length.

25. The device according to claim 16, further comprising measuring the process run-time, wherein the method is terminated if the process run-time reaches a pre-defined time-out value.

* * * * *